US012560285B2

(12) United States Patent
Alutaibi et al.

(10) Patent No.: US 12,560,285 B2
(45) Date of Patent: Feb. 24, 2026

(54) CORROSION MONITORING SYSTEM FOR MULTIPHASE FLUIDS PIPELINES

(71) Applicant: Saudi Arabian Oil Company, Dhahran (SA)

(72) Inventors: Majed M. Alutaibi, Dammam (SA); Hassan A. Basri, Al Jesh (SA)

(73) Assignee: Saudi Arabian Oil Company, Dhahran (SA)

( * ) Notice: Subject to any disclaimer, the term of this patent is extended or adjusted under 35 U.S.C. 154(b) by 420 days.

(21) Appl. No.: 18/120,803

(22) Filed: Mar. 13, 2023

(65) Prior Publication Data

US 2024/0310005 A1 Sep. 19, 2024

(51) Int. Cl.
*F17D 5/00* (2006.01)
*F17D 1/00* (2006.01)
*G01N 17/04* (2006.01)

(52) U.S. Cl.
CPC ............. *F17D 5/005* (2013.01); *F17D 1/005* (2013.01); *G01N 17/043* (2013.01)

(58) Field of Classification Search
CPC ........ F17D 5/005; F17D 1/005; G01N 17/043
See application file for complete search history.

(56) References Cited

U.S. PATENT DOCUMENTS

| | | | |
|---|---|---|---|
| 5,208,162 A | 5/1993 | Osborne et al. | |
| 6,271,766 B1 * | 8/2001 | Didden ................. | E21B 47/135 |
| | | | 340/854.7 |
| 7,541,817 B2 | 6/2009 | Nielsen et al. | |
| 9,095,736 B2 * | 8/2015 | Kochelek ............ | G01M 3/2853 |
| 11,680,757 B2 * | 6/2023 | Vitse ....................... | F28F 27/00 |
| | | | 165/288 |
| 2012/0007617 A1 * | 1/2012 | Fisseler ................. | G01N 17/02 |
| | | | 324/700 |
| 2016/0139030 A1 | 5/2016 | Jovanccevc et al. | |
| 2022/0065103 A1 * | 3/2022 | Rowe ....................... | E21B 7/15 |
| 2022/0169927 A1 * | 6/2022 | Galloway ................ | C10G 2/31 |
| 2022/0243562 A1 * | 8/2022 | Al-Anazi ............ | G01N 17/006 |
| 2024/0192123 A1 * | 6/2024 | Robison ................ | G01N 17/04 |

FOREIGN PATENT DOCUMENTS

CA 1210066 8/1986

* cited by examiner

*Primary Examiner* — Lee E Rodak
*Assistant Examiner* — Zannatul Ferdous
(74) *Attorney, Agent, or Firm* — Fish & Richardson P.C.

(57) ABSTRACT

To monitor corrosion in multiphase fluids pipelines, a first pipe is fluidically coupled to extend perpendicularly away from a bottom portion of a multiphase hydrocarbons pipeline. The multiphase hydrocarbons include oil, gas and water. The first pipe is fluidically coupled to a T-shaped pipe subassembly including a second pipe and a third pipe attached to the second pipe to form a T-shape. A hydrocarbon sample of the multiphase hydrocarbons is drawn into the first pipe. Gas in the hydrocarbon sample separates gravimetrically from oil and water in the hydrocarbon sample. The hydrocarbon sample is flowed from the first pipe through the T-shaped pipe subassembly. The hydrocarbon sample is analyzed using a corrosion coupon attached to one end of the third pipe and a corrosion probe attached to another end of the third pipe. A level of corrosion of the pipeline is determined based on results of analyzing the hydrocarbon sample.

18 Claims, 3 Drawing Sheets

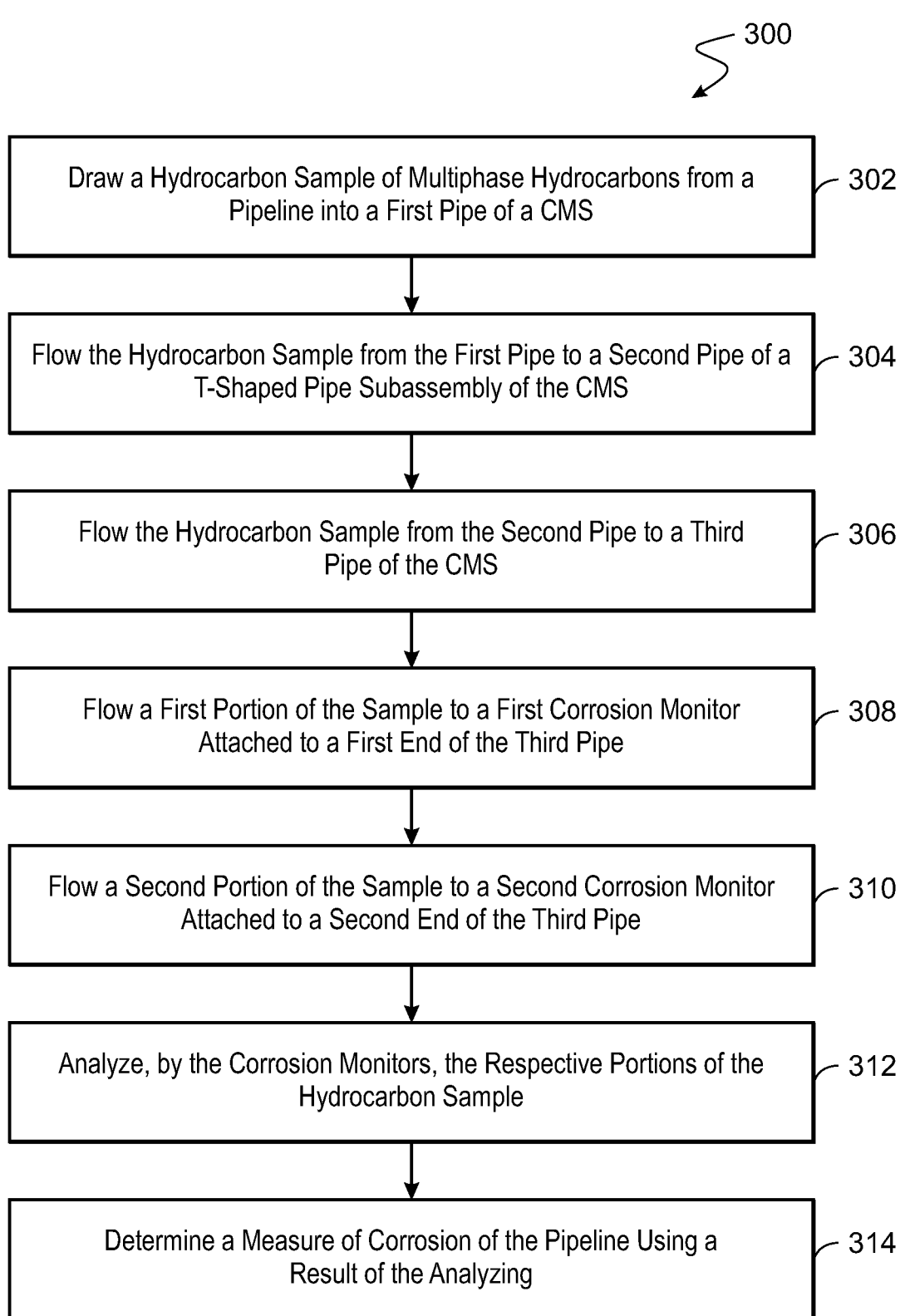

300

Draw a Hydrocarbon Sample of Multiphase Hydrocarbons from a Pipeline into a First Pipe of a CMS — 302

Flow the Hydrocarbon Sample from the First Pipe to a Second Pipe of a T-Shaped Pipe Subassembly of the CMS — 304

Flow the Hydrocarbon Sample from the Second Pipe to a Third Pipe of the CMS — 306

Flow a First Portion of the Sample to a First Corrosion Monitor Attached to a First End of the Third Pipe — 308

Flow a Second Portion of the Sample to a Second Corrosion Monitor Attached to a Second End of the Third Pipe — 310

Analyze, by the Corrosion Monitors, the Respective Portions of the Hydrocarbon Sample — 312

Determine a Measure of Corrosion of the Pipeline Using a Result of the Analyzing — 314

FIG. 3

CORROSION MONITORING SYSTEM FOR MULTIPHASE FLUIDS PIPELINES

TECHNICAL FIELD

This disclosure relates to monitoring corrosion in multiphase fluids pipelines.

BACKGROUND

Metallic pipelines (or flowlines) carry multiphase hydrocarbons (e.g., oil, gas, water, combinations of them) that are corrosive in nature, e.g., due to the presence of sour gases like hydrogen sulfide or carbon dioxide or both, the presence of microbes and deposits in water, the water chemistry or other reasons. Water wetting as a function of crude grade, water cut and flow velocity are also factors contributing to corrosion. Corrosion monitors are connected to such pipelines to monitor corrosion. Periodically or based on results of corrosion monitoring, corrosion inhibitors are injected through the pipelines and regular mechanical cleaning/scraping is conducted within the pipelines to distribute the chemical to form a protection film along the pipeline wall to mitigate or prevent the internal corrosion. One technique to monitor or measure corrosion in a pipeline is based on a quantity of water carried by the multiphase fluid that is flowed through the pipeline and a corrosion rate and CI residual. Another technique is based on a quantity of organisms (e.g., bacteria, sludge) that can be found in a fluid sample collected from the fluid flowing through the pipeline.

SUMMARY

This disclosure describes technologies relating to a corrosion monitoring system for a multiphase fluids pipeline.

Certain aspects of the subject matter described here can be implemented as a pipeline corrosion monitoring system. The system includes a first pipe that can fluidically couple to a pipeline through which multiphase hydrocarbons are flowed. The multiphase hydrocarbons include oil, gas and water. The first pipe can draw a hydrocarbon sample of the multiphase hydrocarbons flowed through the pipeline. The system includes a T-shaped pipe subassembly. The subassembly includes a second pipe fluidically coupled to receive the hydrocarbon sample from the first pipe. A third pipe is fluidically coupled to the second pipe to form the T-shaped pipe subassembly, and can receive the hydrocarbon sample from the second pipe. The third pipe includes a first end and a second end. A first corrosion monitor is coupled to the first end. A second corrosion monitor different from the first corrosion monitor is coupled to the second end. The first corrosion monitor and the second corrosion monitor can each receive a respective portion of the hydrocarbon sample from the second pipe and measure properties of the respective portion of the hydrocarbon sample. A controller is operatively coupled to the first corrosion monitor and the second corrosion monitor. The controller can perform operations including receiving the properties measured by each of the first corrosion monitor and the second corrosion monitor, and determining a measure of corrosion of the pipeline using the properties measured by either the first corrosion monitor or the second corrosion monitor.

An aspect combinable with any other aspect includes the following features. The first corrosion monitor is a corrosion coupon.

An aspect combinable with any other aspect includes the following features. The controller can determine long-term corrosion in the pipeline using the properties measured by the corrosion coupon.

An aspect combinable with any other aspect includes the following features. The second corrosion monitor is a corrosion probe.

An aspect combinable with any other aspect includes the following features. The controller can determine real-time corrosion in the pipeline using the properties measured by the corrosion probe.

An aspect combinable with any other aspect includes the following features. The system includes a sample collection container fluidically coupled to the third pipe that can receive a portion of the hydrocarbon sample from the third pipe. The system can include a fluid analyzer operatively coupled to the sample collection container that can analyze properties of the portion of the hydrocarbon sample received in the sample collection container.

An aspect combinable with any other aspect includes the following features. The fluid analyzer includes a gas chromatography mass spectrometer (GC-MS), a scanning electron microscope-energy dispersive spectrometer (SEM-EDS) or an X-ray diffraction (XRD) analyzer.

An aspect combinable with any other aspect includes the following features. The system includes a drain sub-system fluidically coupled to the T-shaped pipe subassembly. The drain sub-system can draw the hydrocarbon sample from within the T-shaped pipe subassembly for disposal.

Certain aspects of the subject matter described here can be implemented as a method. A hydrocarbon sample of multiphase hydrocarbons flowed through a pipeline is drawn. The multiphase hydrocarbons include oil, gas and water. The hydrocarbon sample is drawn through a first pipe fluidically coupled to the pipeline. The hydrocarbon sample is flowed from the first pipe to a second pipe of a T-shaped pipe subassembly. The hydrocarbon sample is flowed from the second pipe to a third pipe attached to the second pipe to form the T-shape. The third pipe includes a first end and a second end. A first portion of the hydrocarbon sample flowed to the third pipe is flowed to a first corrosion monitor coupled to the first end. A second portion of the hydrocarbon sample flowed to the third pipe is flowed to a second corrosion monitor coupled to the second end. The second corrosion monitor is the same as or different from the first corrosion monitor. The first corrosion monitor and the second corrosion monitor analyze the first portion and the second portion of the hydrocarbon sample, respectively. A measure of corrosion of the pipeline is determined using a result of the analyzing by the first corrosion monitor or the second corrosion monitor.

An aspect combinable with any other aspect includes the following features. The first pipe is fluidically coupled to a bottom portion of the pipeline to draw the hydrocarbon sample of the multiphase hydrocarbons.

An aspect combinable with any other aspect includes the following features. A section of the pipeline at which the multiphase hydrocarbons stagnate is identified. The first pipe is fluidically coupled to the bottom portion of the identified section.

An aspect combinable with any other aspect includes the following features. The first corrosion monitor is a corrosion coupon. Long-term corrosion in the pipeline is determined using the properties measured by the corrosion coupon.

An aspect combinable with any other aspect includes the following features. The second corrosion monitor is a corrosion probe. Real-time corrosion in the pipeline is determined using the properties measured by the corrosion probe.

An aspect combinable with any other aspect includes the following features. A third portion of the hydrocarbon sample is flowed from the third pipe to a sample collection container fluidically coupled to the third pipe. Properties of the third portion of the hydrocarbon sample received in the sample collection container are analyzed.

An aspect combinable with any other aspect includes the following features. The properties of the third portion are analyzed using a gas chromatography mass spectrometer (GC-MS), a scanning electron microscope-energy dispersive spectrometer (SEM-EDS) or an X-ray diffraction (XRD) analyzer.

Certain aspects of the subject matter described here can be implemented as a method. A first pipe is fluidically coupled to extend perpendicularly away from a bottom portion of a pipeline through which multiphase hydrocarbons are flowed. The multiphase hydrocarbons include oil, gas and water. The first pipe is fluidically coupled to a T-shaped pipe subassembly including a second pipe and a third pipe attached to the second pipe to form a T-shape. A hydrocarbon sample of the multiphase hydrocarbons is drawn into the first pipe. Gas in the hydrocarbon sample separates gravimetrically from oil and water in the hydrocarbon sample. The hydrocarbon sample is flowed from the first pipe through the T-shaped pipe subassembly. The hydrocarbon sample is analyzed using a corrosion coupon attached to one end of the third pipe and a corrosion probe attached to another end of the third pipe. A level of corrosion of the pipeline is determined based on results of analyzing the hydrocarbon sample.

An aspect combinable with any other aspect includes the following features. A section of the pipeline at which the multiphase hydrocarbons stagnate is identified. The first pipe is fluidically coupled to the bottom portion of the identified section.

An aspect combinable with any other aspect includes the following features. Over time, multiple hydrocarbon samples of the multiphase hydrocarbons, each drawn through the first pipe and flowed into the T-shaped pipe subassembly, are analyzed. A time rate of corrosion of the pipeline is determined based on results of the analyzing over time.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart of an example of a process of monitoring corrosion in the pipeline using the corrosion monitoring system of FIG. 1.

Like reference numbers and designations in the various drawings indicate like elements.

DETAILED DESCRIPTION

Corrosion of metals is a natural phenomenon that significantly impacts the oil and gas industry requiring extensive control to limit impact. Corrosion monitoring is used to limit and control corrosion of pipelines through which multiphase hydrocarbons are flowed by understanding the behavior of the pipelines' internal environment. By periodically monitoring hydrocarbon-flowing pipelines, corrosive effects can be minimized, pipeline integrity can be maintained and pipeline lifespan can be lengthened.

This disclosure describes a corrosion monitoring system (CMS) that uses corrosion rates monitoring principles supported with fluid composition analyses. By doing so, the CMS provides an overall assessment and monitoring of corrosion parameters such as corrosion rate (CR), corrosion inhibitor (CI) performance, corrosion products formation and asset integrity in pipelines that carry multiphase fluids, e.g., multiphase hydrocarbons including oil, gas and water. As described below, the CMS implements a corrosion coupon, a corrosion probe and a sampling station in a T-shaped (or T-trap) configuration. The CMS also implements double block and bleed to deliver safe optimum sensing capabilities within the pipelines.

Figure 1:
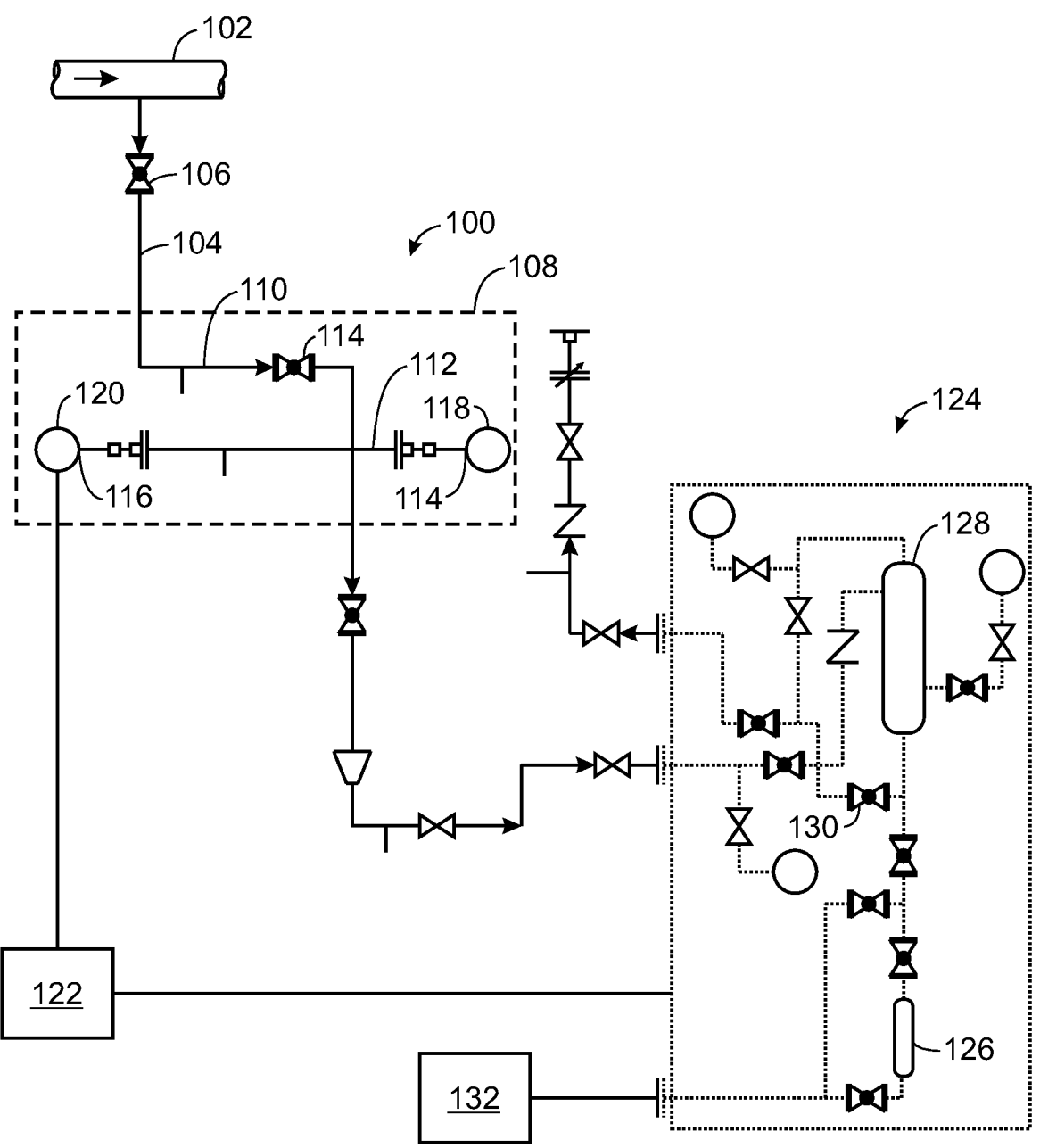
FIG. 1 is a schematic diagram of an example of a corrosion monitoring system fluidically coupled to a pipeline flowing multiphase fluids.

FIG. 1 is a schematic diagram of an example of a corrosion monitoring system (CMS) fluidically coupled to a pipeline flowing multiphase fluids. The CMS 100 is fluidically coupled to a pipeline 102, for example, a pipeline through which multiphase fluid including liquid and gas is flowed. In some implementations, the pipeline 102 flows multiphase hydrocarbons including oil, gas and water. The CMS 100 can be implemented with any pipeline through which any type of corrosive fluid is flowed. FIG. 1 schematically shows one CMS 100 fluidically coupled to one location in the pipeline 102 to monitor corrosion at that location. Multiple CMS' can be fluidically coupled to respective locations along the pipeline 102, and can be collectively deployed to monitor corrosion at the respective locations. The results of the monitoring can be used to develop a time-varying corrosion profile along the length of the pipeline 102.

The CMS 100 includes a first pipe 104 that can be fluidically coupled to the pipeline 102. The first pipe 104 can draw a hydrocarbon sample of the multiphase hydrocarbons flowed through the pipeline 102. In some implementations, an opening can be of the pipeline 102, formed on an outer surface and an end of the first pipe 104 can be fluidically coupled to the opening such that the hydrocarbon sample flows out of the pipeline 102 and into the first pipe 104. Flow of the hydrocarbon sample out of the pipeline 102 and into the first pipe 104 can be regulated using flow control equipment, e.g., a valve 106, fluidically disposed between the pipeline 102 and the first pipe 104.

In some implementations, the CMS 100 includes a T-shaped pipe subassembly 108 that is fluidically coupled to an end of the first pipe 104. As described below, the T-shaped pipe subassembly 108 includes multiple corrosion monitors using which the hydrocarbon sample drawn from the pipeline 102 can be analyzed, and the results used to make determinations about corrosion levels in the pipeline 102.

The T-shaped pipe subassembly 108 includes a second pipe 110 that is fluidically coupled to the first pipe 104. An end of the second pipe 110 is fluidically coupled to an end of the first pipe 104 such that the hydrocarbon sample flows from the first pipe 104 into the second pipe 110. The valve 106 can be used to regulate flow of the hydrocarbon sample from the first pipe 104 into the second pipe 110.

The T-shaped pipe subassembly 108 includes a third pipe 112 that is fluidically coupled to the second pipe 110 to form the T-shape of the T-shaped pipe subassembly 108. For example, an opening can be formed on a circumferential surface of the third pipe 112, specifically mid-way between the two ends of the third pipe 112. The end of the second pipe 110 can be fluidically coupled to the opening. Such a connection of the second pipe 110 and the third pipe 112 results in a T-shape. Flow of the hydrocarbon sample from the second pipe 110 into the third pipe 112 can be regulated using flow control equipment, e.g., a valve 108, fluidically disposed between the second pipe 110 and the third pipe 112.

The third pipe 112 has two open ends—a first end 114 and a second end 116—each of which is equidistant from where the second pipe 110 fluidically couples to the third pipe 112. A first corrosion monitor 118 is coupled to the first end 114, and a second corrosion monitor 120 is coupled to the second end 116. The corrosion monitors are different from each other. For example, the first corrosion monitor 118 is a corrosion probe, e.g., an electric resistance (ER) probe for non-clean media or an linear polarization resistance (LPR) probe for clean media, based on the media and intended use such as flush probe and wire probe. The second corrosion monitor 120 is a corrosion coupon, e.g., a strip coupon or a flush coupon. Each corrosion monitor receives a respective portion of the hydrocarbon sample that flows into the third pipe 112 from the second pipe 110. Using the received portion, each corrosion monitor performs respective measurements of properties of the received hydrocarbon sample portion.

In some implementations, the CMS 100 includes a controller 122, which can be implemented as a computer system having one or more processors and one or more computer-readable storage media (e.g., non-transitory computer-readable storage media) storing instructions executable by the one or more processors to perform operations described in this disclosure. The controller 122 is operatively coupled (e.g., using wired or wireless connections or combinations of them) to the first corrosion monitor 118 and the second corrosion monitor 120. The controller 122 can receive properties measured by each of the first corrosion monitor 118 and the second corrosion monitor 120. For example, the controller 122 can receive the properties from the first corrosion monitor 118 over wired or wireless networks without operator intervention. The second corrosion monitor 120 being a stand-alone, offline monitor, properties measured by the second corrosion monitor 120 can be uploaded by the operator to the controller 122. Using either or both of the measured properties, the controller 122 can determine a measure of corrosion of the pipeline 102.

For example, the corrosion probe can be periodically (e.g., once every two hours or at a different frequency) connected to a transmitter, which can transmit values sensed by the corrosion probe to the controller 122. Using the values received from the corrosion probe, the controller 122 can measure the general corrosion rate through a change in current that leads to change in the resistivity due to severity of corrosion. In this manner, the controller 122 can use values sensed by the corrosion probe to measure the general corrosion rate or dissolved oxygen to determine a presence of oxygen in the fluids flowed through the pipeline 102. In another example, the corrosion coupon, with the received hydrocarbon sample, can be removed from the end of the third pipe 112 and introduced into testing equipment (not shown), which can test the sample received by the corrosion coupon. The testing equipment can test the hydrocarbon sample for metal loss, bacterial content, and deposits, to name a few. The output of the testing equipment (e.g., a corrosion rate or a pitting rate or both) can be provided as an input to the controller 122. New corrosion coupons can be used when an installed corrosion coupon is saturated.

In some implementations, the controller 122 can determine a time rate of change of corrosion in the pipeline 102 at the location from which the hydrocarbon sample was drawn using the properties measured by either or both corrosion monitors over a time duration. In some implementations, the controller 122 can be a distributed system deployed at multiple locations along the length of the pipeline 102. As described earlier, a respective hydrocarbon sample can be drawn from each location and corrosion monitors can be deployed at each location to measure properties of the received sample. Using the measurements from the multiple corrosion monitors deployed at multiple locations, the controller 122 can determine a corrosion profile for the pipeline 102. The corrosion profile can describe corrosion of the pipeline 102 along the pipeline length or over time or both. The controller 122 can determine the measure of corrosion using properties measured only by one of the two monitors or using properties measured by both monitors.

In some implementations, the CMS 100 can include a sampling station 124 that can receive the hydrocarbon sample that has been flowed through the T-shaped pipe subassembly 108. The sampling station 124 can include a sample collection container 126 into which the hydrocarbon sample drawn from the T-shaped pipe subassembly 108 can be flowed and stored under pre-determined conditions, e.g., pressure, temperature. The sampling station 124 can include additional equipment (e.g., a flash drum 128, flow equipment such as pipes and valves 130) that can be fluidically connected to a drain sub-system 122 using which the hydrocarbon sample can be flushed out of the T-shaped pipe subassembly 108 for disposal before a new sample is drawn from the pipeline 102. The sample stored in the container 126 can be tested using a fluid analyzer that can include one or more of a gas chromatography mass spectrometer (GC-MS), a scanning electron microscope-energy dispersive spectrometer (SEM-EDS) or an X-ray diffraction (XRD) analyzer. Additional tests that can be performed using the sample stored in the container 126 include QcPCR testing to measure bacteria levels in the sample. In some implementations, an output of the fluid analyzer can be provided as an input to the controller 122, which can use the input to further determine a measure of corrosion in the pipeline 102.

In this manner, corrosion coupons measure the average corrosion and pitting rates as well as bacterial analysis of a sample over a set period. The corrosion probe provides continuous online corrosion rate measurements during water buildup. The sampling station can enable the retrieval of different kinds of samples, e.g., one subject to water stagnation and another subject to continuous flow. The controller 122 can analyze the sample subject to water stagnation to provide sufficient corrosion inhibitor residual analysis environment. The controller 122 can analyze the continuous flow sample for geochemical and corrosion products. Together, the controller 122 can use the measurements to provide objective information and comprehensive data, which an operator can use to predict anticipated corrosion damage and identify low spot deterioration along the pipeline 102. In some implementations, the CMS 100 with the controller 122 can be operated to categorize measured corrosion (or corrosion rate or both) into categories, e.g., low, moderate, high. For example, the controller 122 can provide the corrosion category as an output, e.g., as a display signal to a display device, as an audible alarm to an auditory device, or as other output. Based on the categorization, an operator can determine the pipeline condition and understand severity of corrosion within the pipeline 102 and also adjust the existing internal corrosion mitigation program for the pipeline 102.

Figures 2A, 2B:
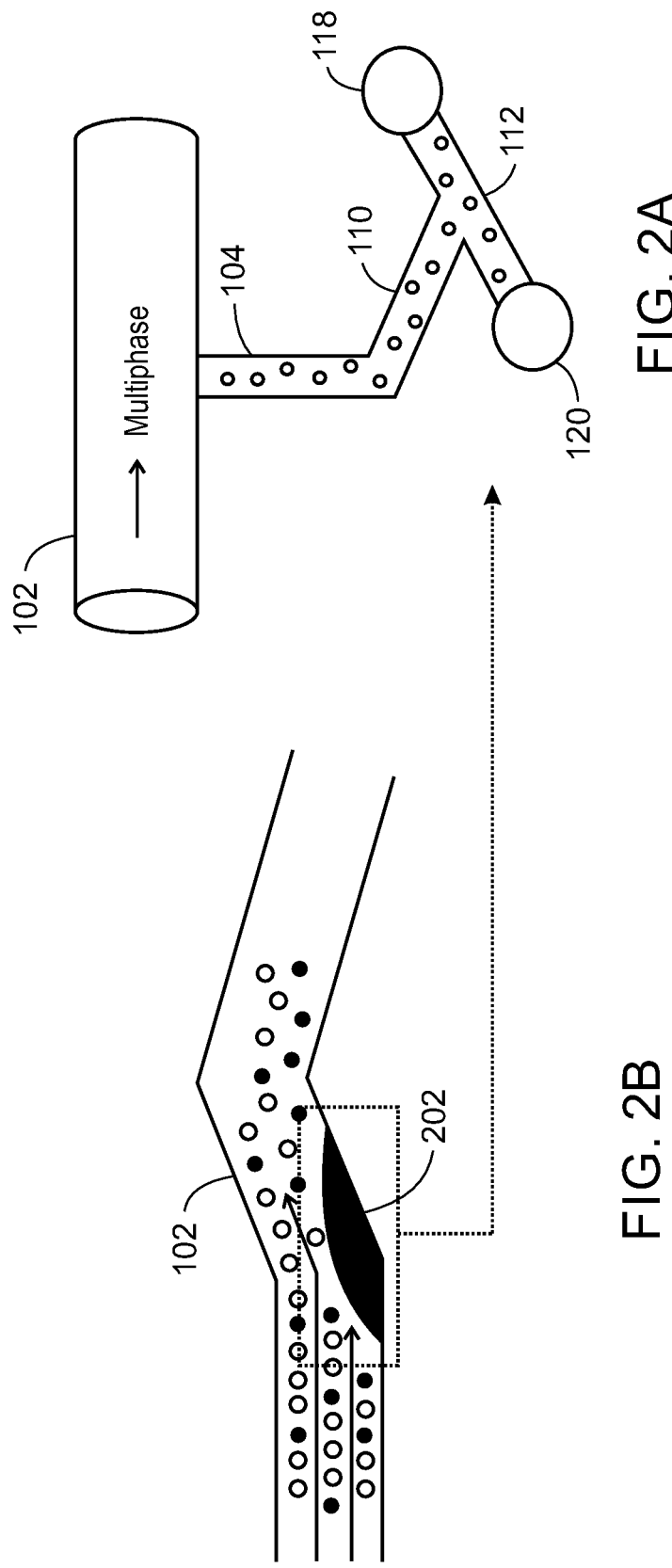
FIG. 2A is a schematic diagram showing a location on a pipeline to which the corrosion monitoring system is fluidically coupled.
FIG. 2B is a schematic diagram showing a stagnation location in the pipeline.

FIG. 2A is a schematic diagram showing a location on a pipeline (e.g., the pipeline 102) to which the CMS 100 is fluidically coupled. For example, the first pipe 104 of the CMS 100 can be coupled to an underside (e.g., a 6 o'clock position) of the circumferential wall of the pipeline 102. The first pipe 104 can extend vertically (with reference to a horizontal plane) from the underside of the pipeline 102. The second pipe 110, which is attached to the first pipe 104, can extend horizontally from (i.e., at a 90 degree angle to) the first pipe 104.

During pipeline operational process, both valves 106 and 114 (FIG. 1) can be kept open to allow the fluid from the pipeline 102 to enter the T-shaped pipe subassembly 108 and to flow towards the corrosion monitors 118 and 120 (FIG. 1). After a duration, gravimetric separation of the water and oil (more water and less oil) occurs from the hydrocarbon sample flowing towards the corrosion monitors 118 and 120 (FIG. 1) through the second pipe 110 and the third pipe 112. The duration is also sufficient for gas in the T-shaped pipe subassembly 108 to rise through the vertically installed first pipe 104 and separate from the liquid in the hydrocarbon sample after the duration.

FIG. 2B is a schematic diagram showing a stagnation location in the pipeline 102. A stagnation location is a location in the pipeline 102 in which a quantity of the fluid flowing through the pipeline 102 accumulates, e.g., because of a bend/low spot 202 in the pipeline 102. The stagnated fluid can have undergone the gravimetric separation described earlier. By fluidically coupling the first pipe 104 to the underside of the pipeline 102 at the stagnation location, water-rich hydrocarbon sample can be drawn for the corrosion analysis by the CMS 100.

FIG. 3 is a flowchart of an example of a process 300 of monitoring corrosion in the pipeline using the corrosion monitoring system of FIG. 1. The process 300 can be implemented using the CMS 100 (FIG. 1). At 302, a hydrocarbon sample of multiphase hydrocarbons is drawn from a pipeline (e.g., the pipeline 102) into a first pipe (e.g., the first pipe 104 of the CMS 100). At 304, the hydrocarbon sample is flowed from the first pipe to a second pipe (e.g., the second pipe 110 of the CMS 100). At 306, the hydrocarbon sample is flowed from the second pipe to a third pipe (e.g., the third pipe 112 of the CMS 100). The second pipe is attached to the third pipe to form a T-shaped pipe subassembly (e.g., the subassembly 108 of the CMS 100). At 308, a first portion of the hydrocarbon sample flowed to the third pipe is flowed to a first corrosion monitor (e.g., the corrosion probe) coupled to the first end of the third pipe. At 310, a second portion of the hydrocarbon sample flowed to the third pipe is flowed to a second corrosion monitor (e.g., the corrosion coupon) coupled to the second end of the third pipe. At 312, the corrosion monitors analyze the respective portions of the hydrocarbon sample. At 316, a measure of corrosion of the pipeline is determined (e.g., by the controller 122) using a result of the analyzing.

Thus, particular implementations of the subject matter have been described. Other implementations are within the scope of the following claims.

The invention claimed is:

1. A pipeline corrosion monitoring system comprising:
   a first pipe configured to fluidically couple to a pipeline through which multiphase hydrocarbons are flowed, the multiphase hydrocarbons comprising oil, gas and water, the first pipe configured to draw a hydrocarbon sample of the multiphase hydrocarbons flowed through the pipeline;
   a T-shaped pipe subassembly comprising:
      a second pipe fluidically coupled to and configured to receive the hydrocarbon sample from the first pipe,
      a third pipe fluidically coupled to the second pipe to form the T-shaped pipe subassembly and configured to receive the hydrocarbon sample from the second pipe, the third pipe comprising a first end and a second end, and
      a first corrosion monitor coupled to the first end, and
      a second corrosion monitor different from the first corrosion monitor, the second corrosion monitor coupled to the second end, the first corrosion monitor and the second corrosion monitor each configured to receive a respective portion of the hydrocarbon sample from the second pipe and to measure properties of the respective portion of the hydrocarbon sample; and
   a controller operatively coupled to the first corrosion monitor and the second corrosion monitor, the controller configured to perform operations comprising:
      receiving the properties measured by each of the first corrosion monitor and the second corrosion monitor, and
      determining a measure of corrosion of the pipeline using the properties measured by either the first corrosion monitor or the second corrosion monitor.

2. The system of claim 1, wherein the first corrosion monitor is a corrosion coupon.

3. The system of claim 2, wherein the controller is configured to perform operations comprising determining long-term corrosion in the pipeline using the properties measured by the corrosion coupon.

4. The system of claim 2, wherein the second corrosion monitor is a corrosion probe.

5. The system of claim 4, wherein the controller is configured to perform operations comprising determining real-time corrosion in the pipeline using the properties measured by the corrosion probe.

6. The system of claim 1, further comprising:
   a sample collection container fluidically coupled to the third pipe and configured to receive a portion of the hydrocarbon sample from the third pipe; and
   a fluid analyzer operatively coupled to the sample collection container and configured to analyze properties of the portion of the hydrocarbon sample received in the sample collection container.

7. The system of claim 6, wherein the fluid analyzer comprises a gas chromatography mass spectrometer (GC-MS), a scanning electron microscope-energy dispersive spectrometer (SEM-EDS) or an X-ray diffraction (XRD) analyzer.

8. The system of claim 1, further comprising a drain sub-system fluidically coupled to the T-shaped pipe subassembly, the drain sub-system configured to draw the hydrocarbon sample from within the T-shaped pipe subassembly for disposal.

9. A method comprising:
   drawing a hydrocarbon sample of multiphase hydrocarbons flowed through a pipeline, the multiphase hydrocarbons comprising oil, gas and water, the hydrocarbon sample drawn through a first pipe fluidically coupled to the pipeline;
   flowing the hydrocarbon sample from the first pipe to a second pipe of a T-shaped pipe subassembly;

flowing the hydrocarbon sample from the second pipe to a third pipe attached to the second pipe to form the T-shape, the third pipe comprising a first end and a second end;

flowing a first portion of the hydrocarbon sample flowed to the third pipe to a first corrosion monitor coupled to the first end;

flowing a second portion of the hydrocarbon sample flowed to the third pipe to a second corrosion monitor coupled to the second end, the second corrosion monitor different from the first corrosion monitor;

analyzing, by the first corrosion monitor and the second corrosion monitor, the first portion of the hydrocarbon sample and the second portion of the hydrocarbon sample, respectively; and determining a measure of corrosion of the pipeline using a result of the analyzing by the first corrosion monitor or the second corrosion monitor.

10. The method of claim 9, further comprising fluidically coupling the first pipe to a bottom portion of the pipeline to draw the hydrocarbon sample of the multiphase hydrocarbons.

11. The method of claim 10, further comprising:

identifying a section of the pipeline at which the multiphase hydrocarbons stagnate; and fluidically coupling the first pipe to the bottom portion of the identified section.

12. The method of claim 9, wherein the first corrosion monitor is a corrosion coupon, wherein determining the measure of corrosion of the pipeline using the result of the analyzing by the corrosion coupon comprises determining long-term corrosion in the pipeline using the properties measured by the corrosion coupon.

13. The method of claim 10, wherein the second corrosion monitor is a corrosion probe, wherein determining the measure of corrosion of the pipeline using the result of the analyzing by the corrosion probe comprises determining real-time corrosion in the pipeline using the properties measured by the corrosion probe.

14. The method of claim 8, further comprising:

flowing a third portion of the hydrocarbon sample from the third pipe to a sample collection container fluidically coupled to the third pipe; and analyzing properties of the third portion of the hydrocarbon sample received in the sample collection container.

15. The method of claim 14, wherein analyzing the properties of the third portion of the hydrocarbon sample comprises analyzing the third portion using a gas chromatography mass spectrometer (GC-MS), a scanning electron microscope-energy dispersive spectrometer (SEM-EDS) or an X-ray diffraction (XRD) analyzer.

16. A method comprising:

fluidically coupling a first pipe to extend perpendicularly away from a bottom portion of a pipeline through which multiphase hydrocarbons are flowed, the multiphase hydrocarbons comprising oil, gas and water;

fluidically coupling the first pipe to a T-shaped pipe subassembly comprising a second pipe and a third pipe attached to the second pipe to form a T-shape;

drawing a hydrocarbon sample of the multiphase hydrocarbons into the first pipe, wherein gas in the hydrocarbon sample separates gravimetrically from oil and water in the hydrocarbon sample;

flowing the hydrocarbon sample from the first pipe through the T-shaped pipe subassembly;

analyzing the hydrocarbon sample using a corrosion coupon attached to one end of the third pipe and a corrosion probe attached to another end of the third pipe; and determining a level of corrosion of the pipeline based on results of analyzing the hydrocarbon sample.

17. The method of claim 16, further comprising:

identifying a section of the pipeline at which the multiphase hydrocarbons stagnate; and fluidically coupling the first pipe to the bottom portion of the identified section.

18. The method of claim 16, further comprising:

analyzing, over time, a plurality of hydrocarbon samples of the multiphase hydrocarbons drawn through the first pipe and flowed into the T-shaped pipe subassembly; and determining a time rate of corrosion of the pipeline based on results of the analyzing over time.

* * * * *